United States Patent [19]

Burwell

[11] Patent Number: 5,083,661

[45] Date of Patent: Jan. 28, 1992

[54] LENS AND/OR EYEGLASSES CLEANING DEVICE

[76] Inventor: Carlton Burwell, 117 Via Gayuba St., Monterey, Calif. 93940

[21] Appl. No.: 620,342

[22] Filed: Nov. 29, 1990

[51] Int. Cl.$^5$ .............................................. A45C 11/00
[52] U.S. Cl. ....................................... 206/37; 206/38; 206/233; 15/214
[58] Field of Search .................... 206/5, 37, 37.1, 38, 206/38.1, 223, 233; 15/208, 209 R, 210 R, 214

[56] References Cited

U.S. PATENT DOCUMENTS

| | | | |
|---|---|---|---|
| 1,158,169 | 10/1915 | Bradley et al. | 206/5 |
| 1,726,569 | 9/1929 | Kasting | 206/37 |
| 1,809,696 | 6/1931 | Heilweil | 206/37 |
| 1,823,992 | 9/1931 | Smith | 206/37 |
| 3,119,429 | 1/1964 | Stiller et al. | 206/37 |
| 3,647,059 | 3/1972 | Humphreys | 206/38 |
| 4,833,902 | 5/1989 | Mori | 206/38 |
| 4,854,449 | 8/1989 | Fitzhugh | 206/38 |
| 4,958,401 | 9/1990 | Kurz | 206/37 |
| 5,000,204 | 3/1991 | Smith | 206/5 |

FOREIGN PATENT DOCUMENTS

| | | | |
|---|---|---|---|
| 304989 | 1/1929 | United Kingdom | 15/214 |
| 579397 | 8/1946 | United Kingdom | 206/37 |

*Primary Examiner*—David T. Fidei
*Attorney, Agent, or Firm*—Richard L. Miller

[57] ABSTRACT

A device for cleaning eyeglasses wherein a soft, non-abrasive cleaning cloth can be easily stored in, and removed from, an elongated storage container. A retaining cord is attached near the center of the cloth. The cord extends through the main aperture of the storage container, passes through a small hole at the end of the container opposite the aperture, and is terminated with a stopper bead. The cloth is easily retracted into the storage container by pulling on the cord at the stopper bead end. The cloth is of of such dimensions that when it is fully retracted into the storage container a short tail extends through the aperture. The cloth is removed by pulling on the tail. The stopper bead can be a cap for the aperture or act to latch a hinged lid for the aperture.

2 Claims, 2 Drawing Sheets

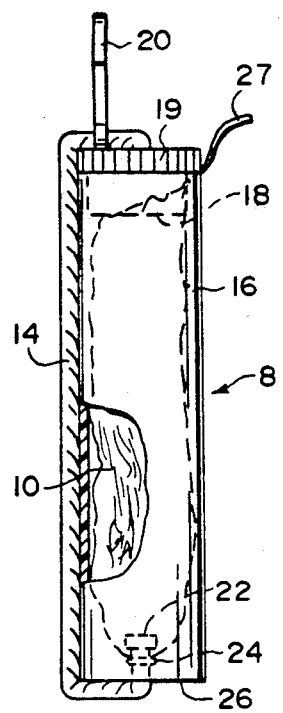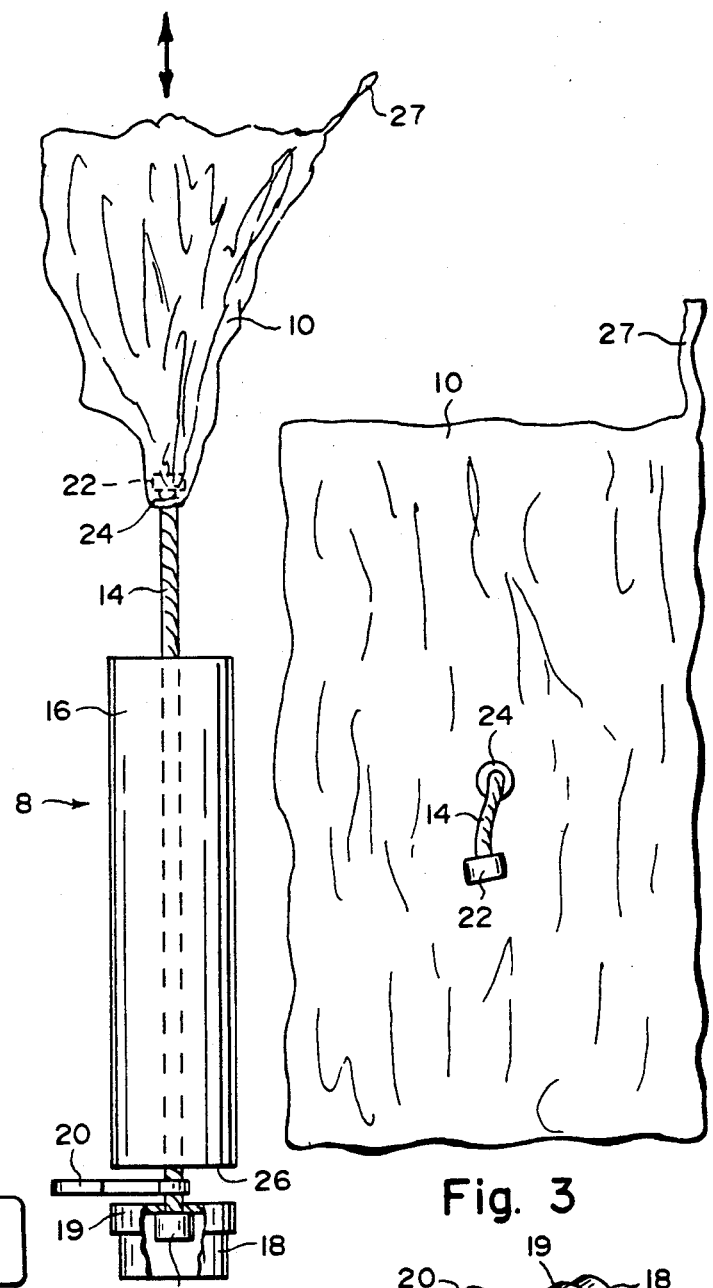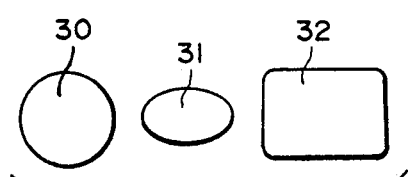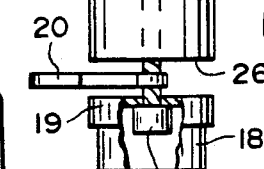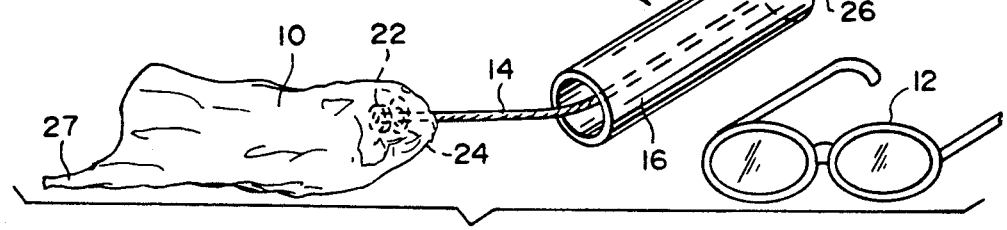

LENS AND/OR EYEGLASSES CLEANING DEVICE

FIELD OF THE INVENTION

This invention relates to a lens and/or eyeglasses cleaning devices, and more particularly to devices which use a nonabrasive fabric for cleaning the vision lenses of eyeglasses. In particular this invention relates to a convenient device for easy and rapid deployment and storage of a nonabrasive fabric which is used to clean eyeglasses.

Numerous eyeglasses cleaning devices have been provided in the prior art that are suitable for cleaning lens. For example, U.S. Pat. Nos. 2,227,710 to Finn; 3,647,059 to Humphery; and 4,818,134 to Tsai all are illustrative of such prior art. While these units may be suitable for the particular purpose to which they address, they would not be as suitable for the purpose of the present invention as hereafter described.

BACKGROUND OF THE INVENTION

A large fraction of the population wears eyeglasses with corrective lenses to improve vision, and/or shaded sunglasses to ease eyestrain caused by intense brightness of the sun's rays. In fact, someone who does not own and use one or both of these types of eyewear is extremely rare in America today.

As anyone who wears eyeglasses or sun glasses knows, eyewear becomes dirty extremely rapidly. Troublesome material which can obscure vision through vision lenses come from a myriad of sources; human oil from face and hands, dirt from the hands, the splattering of food liquids during cooking and eating, particles of dust and pollen from the air etc.

Only a small amount of material, whether opaque, transparent or translucent, is sufficient to affect the light transmitting properties of an eyeglass or sun glass lens. It is well known that looking through dirty lenses causes eyestrain, and that prolonged eyestrain can cause weakened vision Furthermore, vision is a crucial means of sensory input, and hampered vision can be a significant safety hazard.

Often, an eyeglasses wearer finds himself in a situation where it is inconvenient or impossible to clean his or he eyeglasses. For instance, at the beach, ocean spray and suntan oil rapidly accumulate on eyewear, hindering vision. Unfortunately, most articles of fabric become quickly impregnated with sand particles at the beach, and since such articles are then too abrasive to sue for cleaning vision lenses, the beachgoer is stuck with dirty lenses.

As another example, snow skiers commonly wear goggles to reduce the blinding brightness of reflections of the sun off the snow. It is crucial that snow skiers be able to clearly see the contours of the snow. But when a skier falls, the skier's goggles typically become covered with snow. Since ski clothing is water repellant it is practically impossible to remove the melted snow from t he lenses by rubbing them against the clothes.

It is in these situations, as well as many others, that a compact vision lens cleaning device would be extremely useful. Whereas other inventions have provided compact lens cleaning devices, these inventions are generally complicated and inelegant and require a number of steps, and considerable manual dexterity, to deploy, to use and to store the cleaning device.

SUMMARY OF THE INVENTION

This invention seeks to provide a vision lens cleaning device which can be easily used, and rapidly, simply and conveniently stored and deployed.

It is therefore an object of this invention to provide a useful and convenient vision lens cleaning device.

It is another object of this invention to provide a compact vision lens cleaning device.

It is another object of this invention to provide a vision lens cleaning device which requires a minimum of manual dexterity.

It is another object of this invention to provide a device which allows one to easily store and deploy a swatch of fabric in an elongated container.

Other features and advantages of the present invention will become apparent from the following detailed description of the preferred embodiments of the present invention with the reference to the accompanying drawings.

BRIEF DESCRIPTION OF THE DRAWING FIGURES

The figures in the drawings are briefly described as follows:

FIG. 1 is a perspective view illustrating the instant invention opened and ready for cleaning eyeglasses;

FIG. 2 is an elevational view of the instant invention in an opened position with parts broken away;

FIG. 3 is a flat open top plan view of the cleaning cloth per se;

FIG. 4 is a diagrammatic cross-sectional views of different embodiments showing various storage container shapes;

FIG. 5 is an elevational view of the invention in a closed position with parts broken away;

DETAILED DESCRIPTION OF THE INVENTION

Figure 7:
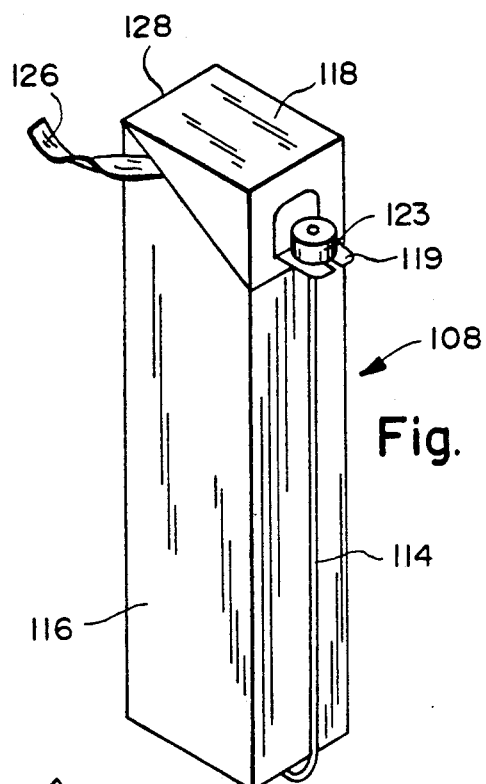
FIG. 7 is a perspective view of the second embodiment in a closed position.

FIG. 1 shows an overall perspective view of a first preferred embodiment 8 of the invention next to a pair of eyeglasses 12. The elements of the invention of this embodiment are constrained to a five inch long, braided cord 14. The cord 14 has a diameter of ⅛". A cylindrical stopper bead 22, with a height of ¼", an outer diameter of ¼" and an inner diameter of ⅛" is attached to an end of the cord 14; the cord 14 passes through the bore of the bead 22 and is glued in place. The stopper bead 22 is made of clear plastic. Beads of this type can be purchased at stores where macrame items are sold. It is to be understood various dimensions may vary widely depending on different design choices and that those indicated are for clarity, only typical and are not to be construed as any sort of limitation on the construction of the instant invention.

As shown in FIG. 2, the stopper bead 22, a cleaning cloth 10, a storage container 16, a metal snap clip 20, a cap 18, and a second stopper bead 23 are constrained, in that order, to the cord 14. The second stopper bead 23 has the same dimensions as the first stopper bead the cord 14 in the same fashion. The cleaning cloth 10 is chamois and has a brass grommet 24 of inner diameter ⅛" positioned near the center of the cloth 10. The cord 14 passes through the grommet 24.

The storage container 16 is made of thin plastic. The storage container 16 has a length of 3½" and a diameter of ⅞". The outer surface of the container 16 may be decorated with an advertisement or logo. The end of the container 16 nearest the snap clip 20 is sealed with a nonremovable bottom lid 26 with a circular of hole 28 of diameter ⅛" in the center; the cord 14 passes through the hole 28. The end of the container 16 nearest the cleaning cloth 10 is not sealed.

Between the cap 18 and the lid 26 is the metallic snap clip 20. The snap clip 20 provides a means for the device 8 to be attached to a belt loop or key ring. The snap clip 20 is approximately 1" long. Snap clips of this type may be purchased at most hardware stores.

At the end of the cord 14 is a plastic cap 18. The cap 18 es essentially cylindrical and has a height of ½" and a diameter of ⅞". For ease of reference, the region of the cap 18 nearest the point where the cord 14 is attached to the cap 18 will be referred to as the "top" of the cap 18. A cylindrical section 19 at the top of the cap 18 with a height of ⅜" has a corrugated surface for ease of griping. The outer diameter of the corrugated section 19 is approximately 1/16" larger than the inner diameter of the storage container 16 preventing the cap 18 from completely entering the storage container 16. Form the cutaway view of the cap 18 it can be seen that the cord 14 passes through a ⅛" hole in the cap, and the cap is constrained to the cord 14 by the second cylindrical stopper bead 23.

FIG. 3 shows an elevational view of the cloth 10, the stopper bead 22, and the cord 14. The cloth 10 is rectangular with a small tail-like protrusion 27 near a corner. The dimensions of the rectangle are 3½" by 5", and the tail 26 is 5/4" long and ¼" wide.

As diagrammed in FIG. 4, the cross-sectional shape of the container 16 may be circulate 30, oval 31 or substantially rectangular 32. Different cross-sectional shapes will be appropriate for different types of uses and will have different types of anesthetic appeal.

In FIGS. 1 and 2 the cloth 10 is in the deployed position and can be used for cleaning purposes. The container 16, the snap clip 20 and the cap 18 are small and light and do not hinder one from using the cleaning cloth 10 to clean the pair of eyeglasses 12. The cleaning cloth 10, the container 16, the snap clip 20, and the plastic cap 187 are clearly constrained to the chord 14 in the order listed.

After use of the cleaning cloth 10, the cloth 10 may be quickly and easily stored in the storage container 16 by pulling the cap 18 away from the container 16. As shown in FIG. 5, the cloth 10 will be drawn into the container 16 until the cloth 10 and the stopper bead 23 are flush against the bottom lid 26 of the container 16. The dimensions and geometry of the cloth 10 and the storage container 16 are such that when the cloth 10 has been fully retracted into the storage container 16, the tail 27 protrudes past the end of the storage container 16. The cap 18 may then be inserted into the open end of the container 16 while the tail 27 remains protruding out. This final storage configuration is shown as FIG. 5.

Unloading the cloth 10 from the storage configuration of FIG. 5 is also very simple and easy. The cap 18 is removed from the container 16, and while holding the container 16, the tail 27 is grasped and pulled in a direction away from the container 16. If the tail 26 did not protrude past the end of the container 16, or if there was not a tail section 27 of the cloth 10, the user would have a difficult time grasping the cloth 10 in the stored position since the container 26 is only wide enough for the user to insert a single finger.

Figure 6:
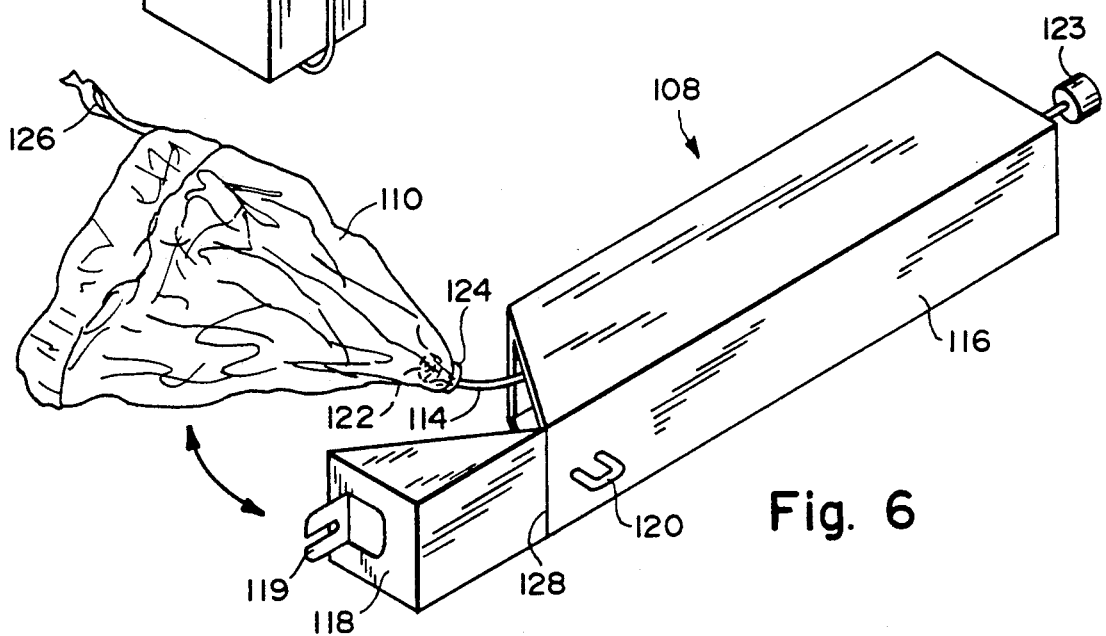
FIG. 6 is a perspective view illustrating a second embodiment of the instant invention open and ready for cleaning eyeglasses.

A second preferred embodiment 108 is shown in FIG. 6. In this embodiment 108 the cord 114 is made of a clear flexible plastic with a diameter of approximately 1/32". The cord 114 is approximately 4" long. Cylindrical stopper beads 122 and 123, with 123, with a height of 1/5", an outer diameter of ¼" and an inner diameter of ⅛" are attached to each end of the cord 114; the cord 114 passes through the bore of each bead 122 and 123 and is glued in place. The bead 122 and 123 are made of clear plastic.

Constrained to the cord 114 is a chamois cleaning cloth 110 and a storage container 116. The cloth 10 has a metal grommet 126 near the center of the cloth 110 with an inner diameter of 3/16". The cord 114 passes through the grommet 126. The cloth 110 is substantially rectangular with a small tail-like protrusion 126 extending from a corner of the cloth 110. The rectangular dimensions of the cloth 110 are 5.5" by 3", and the tail 126 is 1" long and ⅛" wide.

The cord 114 passes through a small hole at the sealed end of the storage container 116. The sealed end of the container 116 will be referred to as the "bottom" of the container, and of course the other end of the elongated container will be referred to as the "top". The container is made of a clear light-weight plastic and has a rectangular cross section of ⅞" by ⅝".

There is a small plastic utility ring 120 protruding from the side of the container 116. The utility ring may, for instance, be used to attach the device 108 to a key ring. The utility ring 120 describes three sides of a square with each side being ¼" long.

A lid 118 is connected to the top of the container 116 by a hinge 1287. The hinge 128 is a piece of flexible plastic bridging the lid 118 and the container 116 is sealed, the lid-container 118 and 116 assembly has a box shape with a height of 3½".

The face of the lid 118 opposite the hinge has a height and width of protrusion 119. The notched protrusion extends ¼" from the container 116, and has a width of ¼" and a thickness of 1/16". The notch has a width of 1/16".

The cloth 110 as shown in FIG. 6 is in the deployed position and may be used to clean vision lenses. The container 116, lid 118, utility ring 120, notched protrusion 119, hinge 128 and beads 122 and 123 are small and light and do not hinder manipulation of the cloth 110.

After using the cleaning cloth 110, the cloth 110 may be quickly and easily pulled into the storage container 116 by pulling the bead 123 away from the container 116. In FIG. 7 the device 108 is shown with the cloth 110 stored inside the container 116. The dimensions of the container 116 and cloth 110 are such that the tail 126 will extend past the mouth of the container 116 when the cloth 110 is fully retracted. The hinged lid 118 may then be closed on the tail 126 and the cord 114 can be inserted into the notch of the notched protrusion 119; the bead 123 is held by the tension of the cord 114 against the notched protrusion 119 and the lid 118 is secured int he closed position.

The steps for removing the cloth 110 from the container 116 are also simple and easy. By removing the cord 114 from the notch of the notched protrusion 119 the lid 118 can be opened. The tail 126 of the cloth 110 is then grasped and pulled, thereby removing the cloth 110 from the container 116.

Thus, it will be seen that the improvements presented therein, consistent with the objects of the invention for the convenient vision lens cleaner, provide a compact useful vision lens cleaner that is easy to use and requires a minimum of manual dexterity to store, and provide a device for easily and quickly storing and removing a swatch of fabric from an elongated container.

While the above description contains many specifications, these should not be construed as limitations on the scope of the invention, but rather as exemplifications of preferred embodiments thereof. Many other variations are possible. For example, the cloth 10 or 110 can be made of any soft nonabrasive material, the cord 14 or 114 can be any flexible type of string or cord, the storage container 16 or 116 can have a variety of shapes and sizes and can be made of a hard or a flexible material, the snap clip 20 or utility ring 120 are just two examples of means for attaching the invention to other objects, the cloth 10 or 110 could be attached to the cord 14 or 114, respectively, in a variety of fashions, and there are a variety of ways of using the cord 14 or 114, and/or an object at the end of the cord 14 or 114 for sealing the storage container 16 or 116.

Accordingly, the scope of the invention should be determined not by the embodiments illustrated, but by the appended claims and their legal equivalents.

What is claimed is:

1. A lens and/or eyeglasses cleaning device which comprises:

a) a cloth;
   b) a stopper bead;
   c) means for tethering said cloth to said stopper bead;
   d) an elongated storage container;
   e) a first aperture near one end of said storage container;
   f) a second aperture near the other end of said storage container, said tethering means passing through said second aperture and said first aperture, said second aperture being small enough to constrain said container to said tethering means between said cloth and said bed, said container oriented on said tethering means with the second aperture side of said container on the bead side of said tethering means, whereby said cloth can be pulled into said container by grasping said bead and pulling said bead away from said container; and
   g) a lid for said first aperture is hinged to said container near an edge of said first aperture, with a notch on an edge of said lid, wherein said tethering means is flexible and of such length to allow the beaded end of said tethering means to reach said notch, whereby said lid can be secured in a closed position by placing said tethering means in said notch.

2. The lens and/or eyeglasses cleaning device of claim 1, wherein said cloth has a section which can extend past the first aperture end of said container while sealed when said cloth has been fully pulled into said container, whereby said cloth can be easily grasped for removal from said container.

* * * * *